(12) United States Patent
Ji et al.

(10) Patent No.: US 7,437,559 B2
(45) Date of Patent: Oct. 14, 2008

(54) ELECTRONIC MESSAGE AUTHENTICATION

(75) Inventors: Minwen Ji, Sunnyvale, CA (US); Kan Zhang, Palo Alto, CA (US); Marcos K Aguilera, Palo Alto, CA (US); Mark Lillibridge, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 699 days.

(21) Appl. No.: 10/716,588

(22) Filed: Nov. 19, 2003

(65) Prior Publication Data

US 2005/0108533 A1    May 19, 2005

(51) Int. Cl.
    *H04L 9/00*    (2006.01)
(52) U.S. Cl. .................. 713/171; 713/155; 713/164; 713/169; 705/66; 705/75
(58) Field of Classification Search .............. 713/155, 713/169, 171, 164; 711/164; 705/66, 75
    See application file for complete search history.

(56) References Cited

U.S. PATENT DOCUMENTS

2002/0087818 A1* 7/2002 Ripley et al. ................ 711/164
2003/0172120 A1* 9/2003 Tomkow et al. ............. 709/206
2004/0052377 A1* 3/2004 Mattox et al. ............... 380/277

OTHER PUBLICATIONS

"A Fair Non-repudiation Protocol"; Jianying Zhou et al., University of London, 7 pp.
"Certified Email With A Light On-line Trusted Third Party: Design and Implementation"; Martin Abadi et al., WWW2002, May 7-11, 2002.
"A Randomized Protocol for Signing Contracts"; Shimon Even et al., Communications of the ACM, Jun. 1985, vol. 28, No. 6, pp. 637-647.
"How to Time-Stamp a Digital Document"; Stuart Haber, Journal of Cryptology, vol. 3, No. 2, pp. 99-111, 1991, 12 pp.
"Guaranteed Delivery for Secure Electronic Commerce and Payments"; Draft version: Wednesday, Jun. 26, 2002, Amir Herzberg, 25 pp.
"Research Report, Provably Secure Certified Mail"; Birgit Pfitzmann et al., RZ 3207 (#93253) Feb. 14, 2000, Computer Science/Mathematics, 39 pp.

* cited by examiner

Primary Examiner—Thanhnga B Truong

(57) ABSTRACT

A method, and associated apparatus, comprises calculating a first part of a message authentication function by a first processor, calculating a second part of the message authentication function by a second processor, and combining the first and second parts into the message authentication function by the first or second processor. The message authentication function can be used to authenticate data transmitted between the first processor and a third processor.

12 Claims, 3 Drawing Sheets

ELECTRONIC MESSAGE AUTHENTICATION

BACKGROUND

Increasingly, the Internet is becoming a forum for conducting business activities, such as online banking and stock trading. Various security protocols may be used to ensure that the business applications associated with the business activities are reliable and secure. Although some security protocols may provide a measure of reliability and security, at least some of the protocols may not provide adequate certification.

SUMMARY

In at least some embodiments, a method comprises calculating a first part of a message authentication function by a first processor, calculating a second part of the message authentication function by a second processor, and combining the first and second parts into the message authentication function by the first or second processor. The message authentication function can be used to authenticate data transmitted between the first processor and a third processor.

BRIEF DESCRIPTION OF THE DRAWINGS

For a detailed description of embodiments of the invention, reference will now be made to the accompanying drawings in which.

NOTATION AND NOMENCLATURE

Certain terms are used throughout the following description. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections. Unless otherwise explicitly indicated, embodiments discussed herein should be construed as exemplary, and not limiting in scope.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In general, the embodiments described herein permit a data communication between a pair of entities (e.g., a server and a client) to be verified. Further, the embodiments provided herein are directed to client-side verification meaning that communications between client and server are encoded in a trustworthy manner, thereby permitting the source of the data as well as the data itself to be authenticated. Although, client-side logic is shown to assist the client in authenticating data to/from the server, similar logic may be used on the server side to provide comparable authentication to the server.

Figure 1:
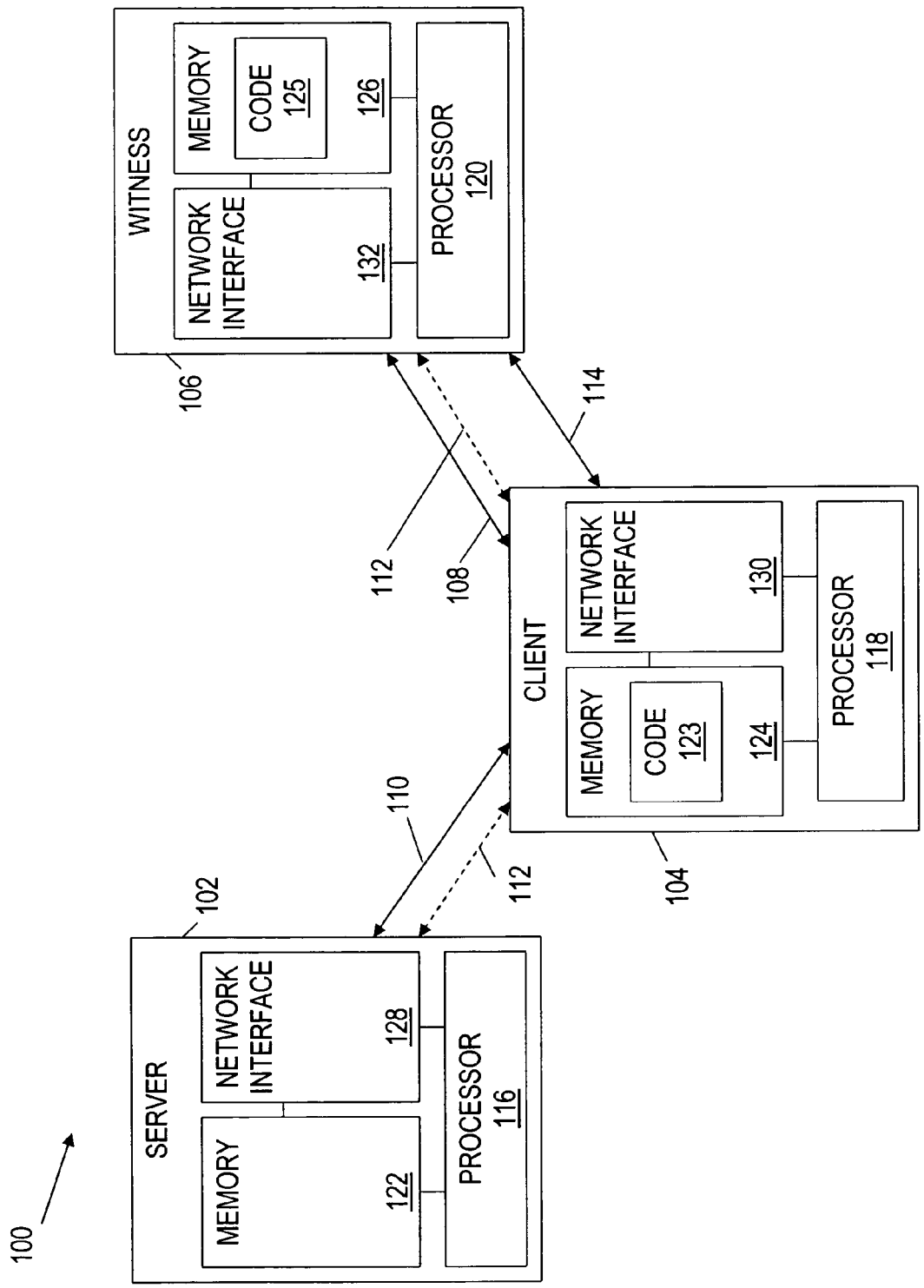
FIG. 1 shows an exemplary system in accordance with some embodiments of the invention, including a client, a server, and a witness.

Referring now to FIG. 1, an electronic witnessing system 100 is shown comprising a server 102, a client 104, and a witness 106. The server 102, the client 104, and the witness 106 may represent computer systems capable of independently communicating over a network, such as the Internet. The server 102, the client 104, and the witness 106 may comprise processors 116, 118, and 120 for executing instructions, non-volatile memory units 122, 124, and 126 for storing data, and network interface adapters 128, 130, and 132 for establishing network connections, respectively. In addition, server 102, the client 104, and the witness 106 may comprise other hardware devices, such as a hard drive, a memory controller, and a keyboard, as desired. The client 104 and witness 106 each may contain executable code 123 and 125, respectively, stored in a storage medium (e.g., memories 124, 126) and executable by processors 118, 120. Such executable code may implement some or all of the functionality described herein.

In accordance with the embodiments of the invention, the electronic witnessing system 100 independently "witnesses" an electronic communication between the client 104 and the server 102. In this context, the verb "witness" means to authenticate the contents of a communications process and the parties involved in the communications process. As described below, a "witness" (noun) refers to an entity that assists in the verification process. The communication process is generated in response to an application, such as an online banking or stock trading system, that may be running on the server 102. The witness 106 may generate "evidence" of the electronic communication between the client 104 and the server 102 in the form of verification records that may indicate the authenticity of the communication process.

The client 104 may establish two transmission control protocol (TCP) connections 108 and 110 with the witness 106 and the server 102, respectively. Data may be exchanged between the client 104 and the witness 106 via the connection 108 and between the client 104 and the server 102 via the connection 110. In other embodiments, user datagram protocol (UDP) may be used in place of the connections 108 and 110.

The client 104 may send a request to the witness 106 through the TCP connection 108 requesting a secure sockets layer (SSL) "session" with the server 102. In general, an SSL session is an established cryptographic-based communications channel between two computer systems. For example, a first computer system may establish an SSL session with a second computer system by performing an SSL "handshake." During the handshake, cryptographic algorithms, such as triple-DES and RC4, that may be used to encrypt communications during the session may be determined. In addition, the handshake may authenticate either computer's identity and generate a shared secret code between the first and second computers. The identify of the second computer may be authenticated by sending an X.509 certificate from the second computer to the first computer. The certificate may contain the second computer's domain name and a "public key" that is signed by a trusted certificate authority, such as VeriSign. The public key allows the first computer to encrypt messages that may be read only by the second computer. The shared secret code may be generated by encrypting a random number on the first computer using the second computer's public key and sending the encrypted random number to the second computer. The second computer may decrypt the random number to replicate the shared secret code, thereby ensuring that the second computer is indeed the system identified by the certificate. In this way, the client 104 can verify the authenticity of the server 102.

An SSL session may comprise one or more SSL "connections." Each SSL connection is layered on a transport protocol, such as TCP. When an SSL connection is created, the session's shared secret code, as previously discussed, may be used to generate symmetric "encryption keys" and message authentication code secrets ("MAC secrets") that are shared between the first and second computer systems. Each direction (i.e., from the first computer to the second computer and from the second computer to the first computer) of the SSL connection may have an associated MAC secret and encryption key. The encryption key facilitates the encryption and decryption of data between the first and second computer systems, while the MAC secret may be used to generate a message authentication code (MAC), as discussed below.

During an SSL connection, data generated by application and control messages, such as a change in the cryptographic algorithms or strength of the algorithms, may be transferred between the first and second computer systems via SSL "records." Each record, optionally compressed to decrease size, is encrypted with the agreed upon cryptographic algorithms via the encryption keys. Included within each record is a sequence number that indicates the relative ordering of an SSL record in relation to other SSL records sent during the SSL connection. When an SSL record is received, the record may be decrypted with the encryption keys. The receiver of the SSL record may re-compute the MAC for the record using the receiver's MAC secret code and compare the re-computed MAC with the MAC included in the SSL record. If the MACs are identical, the record is validated. The validated record may be decompressed if necessary. If the MACs are not identical, due to tampering or other inconsistencies, the session is invalidated. Secure file transfer protocol (SFTP) and secure hypertext transfer protocol (HTTPS) are two examples of applications that use SSL. Other similar applications may use SSL as well.

The MAC associated with an a SSL record may be computed from a one way hashing function referred to as a "MAC function." In general, a one-way hash function, H(m), operates on an arbitrary-length message, m, and returns a fixed-length has value, h, with the following properties: (1) given m, the computation of h may be relatively easy; (2) given h, the computation of m such that H(m)=h may be relatively hard; and (3) given m, it may be relatively hard to find another message m' such that H(m)=H(m').

An iterated one-way hash function, such as MD5 and SHA1, may start with a constant initialization vector (IV) and process a message in fixed-sized blocks, such as 512 bits, and may use the result of the current block to derive the IV for the next block. That is, $$H_c(m)=H_c(m_1+m_2+\ldots+m_n)=H_{V_{i-1}}(m_i+\ldots+m_n),$$
$$V_i=H_{V_{i-1}}(m_i), 1\leq i\leq n, V_o=C \quad (1)$$

where $H_c$ is the hash function with the constant IV=C, $m_1$ through $m_n$ are the sequence of blocks that m is broken into, "+" denotes concatenation, and $H_{V_i}$ is that hash function with $V_i$ as the IV.

In accordance with embodiments of the invention, the message authentication function is used to process a record and to generate a MAC that is record specific. Although the embodiments disclosed below use a particular MAC function called HMAC, other MAC function variants, such as an NMAC function, may similarly be used. The HMAC of an SSL 3.0 record may be computed as:

$$HMAC(\text{secret},\text{seq\_num},\text{length},\text{content})=H(\text{secret}+\text{pad}_2+H(\text{secret}+\text{pad}_1+\text{seq\_num}+\text{length}+\text{content})) \quad (2)$$

where secret represents the MAC secret; seq_num represents the sequence number of the record; content represents the data content of the record; length represents the length of the record content; H( ) is the one-way hashing function; $pad_1$ represents the byte 0×36 repeated 36 times; $pad_2$ represents the byte 0×5c repeated 48 times.

In response to the request for an SSL session from the client 104, the witness 106 may perform an SSL handshake, as previously described, with the server 102. While performing the SSL handshake, the witness 106 may record the handshake messages, including the X.509 certificate and the cryptographic algorithms chosen for the session, in non-volatile memory or another storage mechanism, such as a hard drive, in the witness 106. The generated SSL connection 112 may be operated over the TCP connections 108 and 110 and is "proxied" through the client 104. The proxy forwards all SSL records sent from the witness 106 to the server 102. In addition, the proxy forwards all SSL records sent from the server 102 to the witness 106.

As can be seen from Eq. (2) above, the HMAC is a function, at least in part, on the MAC secret and the record contents. The MAC secret is a data key allowing the computation of the HMAC. In accordance with the embodiments of the invention, the client contains the record contents and the witness contains the data key, e.g., the MAC secret. The client is not permitted to have or otherwise determine the MAC secret, and the witness is not permitted access to the record contents. This aspect by which values that are necessary to compute the HMAC are maintained by separate processors is made possible by decomposing the HMAC into separate parts, at least one part of which is computed by the client and at least another part is computed by the witness. As explained more fully below, the decomposition of the HMAC into the various parts results in the MAC secret being relevant only to the parts that the witness is permitted to compute and the record contents being relevant only to the part that the client is permitted to compute.

The computation of the HMAC may be decomposed into three parts, hereafter referred to as "DeHMAC1," "DeHMAC2," and "DeHMAC3." The processor 120 of witness 106 may calculate the DeHMAC1 and the DeHMAC3, while the processor 118 of client 104 may calculate the DeHMAC2. By decomposing the computation of the HMAC function, the client 104 and the witness 106 each partakes in at least one component of the HMAC calculation. More specifically, the MAC secret associated with an SSL connection may not be revealed to the client 104. In addition, the data contents of an SSL record may not be revealed to the witness 106, thereby creating a mutual dependence between the client 106 and the witness 106 for the generation of the HMAC function that may be needed to carry out SSL communications.

In order to facilitate communication between the client 104 and the server 102, the witness 106 may compute DeHMAC1 as:

$$DeHMAC1 = V_1 = H_C(\text{secret}, \text{pad}_1) \quad (3)$$

and send the DeHMAC1 and the encryption keys, but not the MAC secret, to the client 104 via a secure channel 114 that may operate over the TCP connection 108. The process of sending the DeHMAC1 and the encryption keys may be referred to as a "handover." Once the handover occurs, the client 104 may start to exchange application data with the server 102. However, the client 104 is dependent upon the witness 106 for computing part of the HMAC before sending any SSL records to the server 102. Thus, the client 104 may send SSL records directly to the server 102 only after the witness 106 computes part of the HMAC for a particular SSL record. The secure channel 114 that is used for all messages between the client 104 and the server 102 may be implemented by a secure remote procedure call (SRPC), an additional independent SSL session, or another secure mode of communication.

In the second step, the client 104, receiving DeHMAC1 from the witness 106, may compute DeHMAC2 as:

$$DeHMAC2 = H_{V_1}(\text{seq\_num} + \text{length} + \text{content}) \quad (4)$$

and sends the DeHMAC2 to the witness 106.

In the third step, the witness 106, receiving DeHMAC2 from the client 104, may compute DeHMAC3, and thus HMAC, as:

$$DeHMAC3 = HMAC = H_C(\text{secret} + \text{pad}_2 + DeHMAC2) \quad (5)$$

The above decomposition of the HMAC function may apply to hashing functions, such as MD5, that possess a secret that may be contained in the first block to H( ) with the entire $\text{pad}_1$. For other hashing functions, such as SHA1, part of the $\text{pad}_1$ may be included in Eq. (4) to produce a decomposition of the HMAC function.

Figure 2:
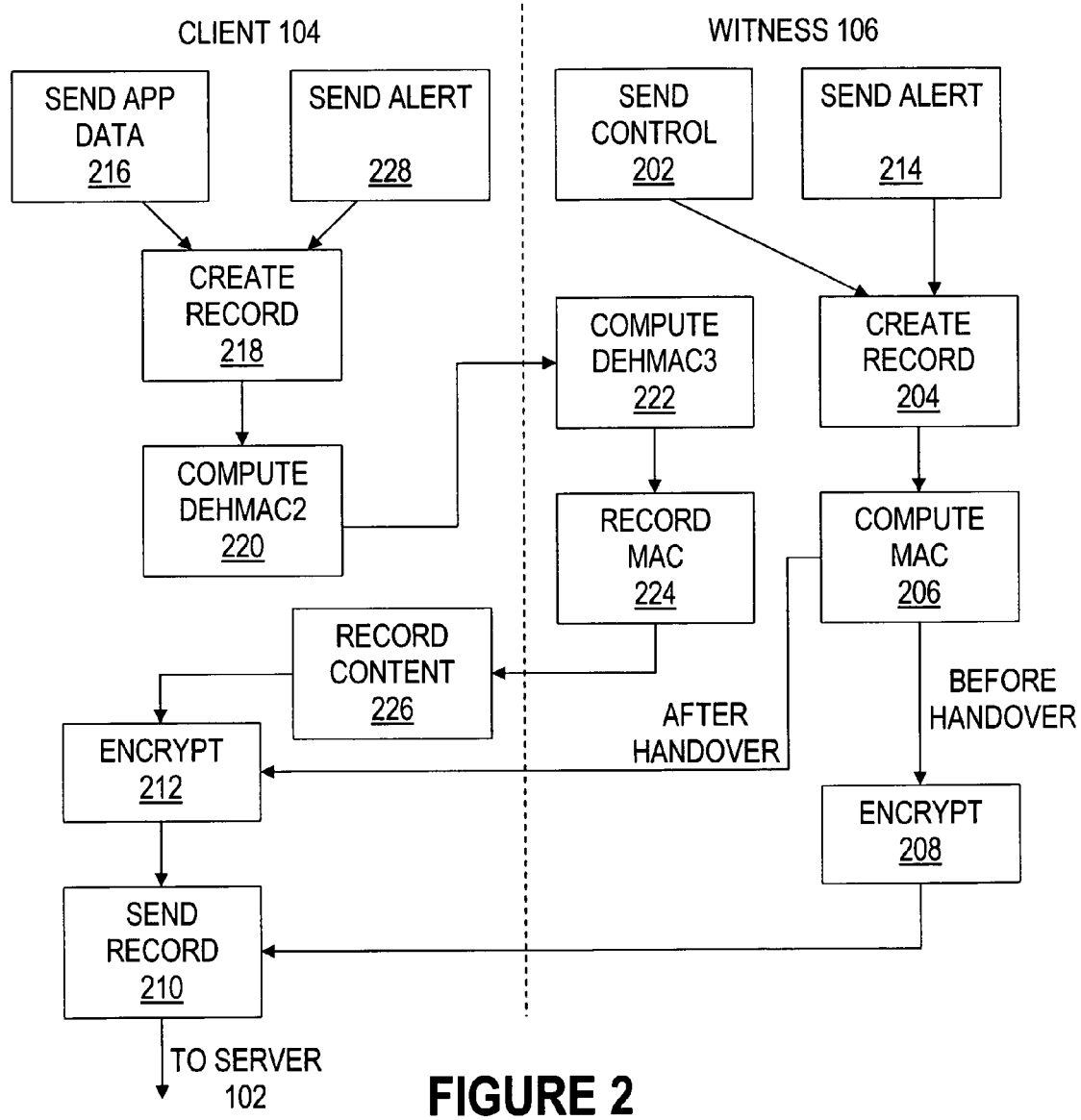
FIG. 2 shows an exemplary flow diagram of a communication process between the client and witness to the server of FIG. 1.

Referring now to FIG. 2, an exemplary block diagram associated with the transmission of an SSL record from the client 104 to the server 102 is shown. The left side of FIG. 2 may represent actions performed by the client 104, whereas the right side may represent actions performed by the witness 106. The transmission of the SSL record may start with the witness 106 sending a control (e.g., a handshake or a change-cipher-spec) message (block 202) by creating an SSL record (block 204) and computing the MAC (block 206) associated with the SSL record. If the handover of encryption keys and the DeHMAC1 to the client 104 has yet to occur, the SSL record is encrypted by the witness 106 (block 208), transferred to the client 104 via the secure channel 114 (FIG. 1), and sent to the server 102 (block 210). If the handover has occurred, the SSL record generated in block 204 may be sent to the client 104 via the secure channel 114 and encrypted by the client 104 (block 212). The record then may be sent to the server 102 (block 210). In addition to sending the control messages (block 202), the witness 106 may also send alert messages (block 214) in a similar manner. Alert messages may inform the server 102 that the SSL session is closing or the SSL session is being invalidated.

The client 104 may send application data (block 216) by creating an SSL record (block 218), computing the DeHMAC2 for the SSL record (block 220), and sending the computed DeHMAC2 to the witness 106. Based on the DeHMAC2, the witness 106 may compute the DeHMAC2, which represents the HMAC, (block 222) and record the MAC associated with the SSL record (block 224). The MAC may be then sent to the client 104, and the client 104 may record the contents of the SSL record (block 226) in non-volatile memory or another permanent storage. The SSL record with the MAC attached then may be encrypted by the client 104 (block 212) and sent to the sever (block 210). Alert messages, in addition to the application data, may also be sent by the client 104 (block 228) to inform the server 102 that the SSL session is closing or the SSL session is being invalidated.

Figure 3:
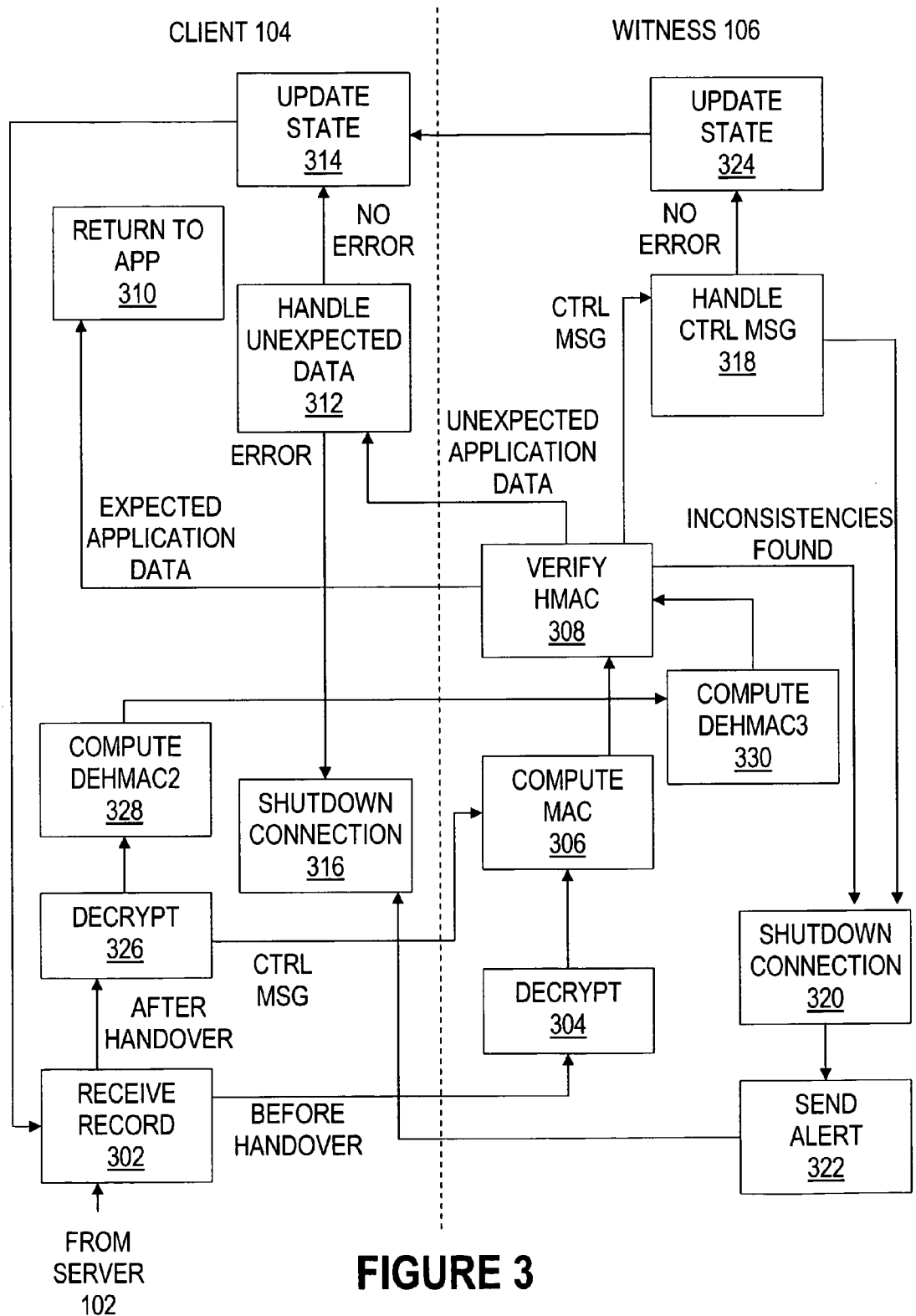
FIG. 3 shows an exemplary flow diagram of a communication process from the server to the client and witness of FIG. 1.

Referring now to FIG. 3, an exemplary block diagram of a communication from the server 102 to the client 104 is shown. The left side of FIG. 3 may represent actions performed by the client 104, whereas the right side may represent actions performed by the witness 106. The transmission may start by the client 104 receiving an encrypted SSL record from the server 102 (block 302). Before the handover of encryption keys and the DeHMAC1, the record may be sent to and decrypted by the witness 106 (block 304) and the MAC for the record may be computed (block 306). The computed MAC is then verified against the MAC contained in the SSL record (block 308). If inconsistencies are found during the verification, the SSL connection is shutdown by the witness 106 (block 320). If no inconsistencies are found and the SSL record is expected application data, the record may be incorporated into the application by the client 104 (block 310). If no inconsistencies are found but the record is unexpected application data, the SSL record may undergo error handling in the client 104 (block 312). If an error is detected during the handling of unexpected application data (block 312), the connection is shutdown (block 316). If no error is detected during the handling (block 312), the client 104 may update a state variable (e.g., next sequence number to receive), if necessary, and receive the next SSL record (block 302). If no inconsistencies are found and the SSL record is a control message, the record is handled by the witness 106 (block 318). If the handling procedure (block 318) determines that an error has occurred, the SSL connection may be shutdown by the witness 106 (block 320), an alert message may be sent to the server 102 (block 322), and the SSL connection on the client 104 also may be shutdown (block 316). If the error handling procedure (block 318) determines that no error has occurred, the state of the witness may be updated, if necessary, (block 324) and the state of the client 104 also may be updated, if necessary (block 314). The client then may receive the next record (block 302).

When the client receives an SSL record (block 302) after the handover of encryption keys and the DeHMAC1, the record may be decrypted by the client 104 (block 326). If application data is found in the decrypted record, the DeHMAC2 may be computed for the received record by the client 104 (block 328). The computed DeHMAC2 then may be sent to the witness 106 where the DeMAC3, and thus the HMAC, may be computed (block 330) and a MAC generated for the record. The computed MAC may be verified (block 308) and the same procedure as discussed above may result from the verification. Although not specifically shown in FIG. 3, the recording of the MAC by the witness 106 and the recording of the content of the SSL record also may occur, as previously described.

If a control message, such as an alert message, is found during decryption (block 326), the record is sent to the witness 106 where the MAC for the record is computed (block 306) and the computed MAC may be verified (block 308) as previously discussed.

The sending and receiving of SSL records as described in FIGS. 2 and 3 may continue until the application is terminated, at which time the SSL connection on the server 102, the client 104, and the witness 106 may be shutdown.

After the SSL session is shutdown without errors, the witness 106 may digitally sign the recorded server 102 certificate, per-connection MAC secrets, MACs and sequence numbers and send the information to the client 104 as the evidence of the SSL communication. In case of failure by the server 102, the client 104, or the witness 106, throughout any phase of the communication, the evidence may not be sent from the witness 106 to the client 104.

To verify the evidence as authentic, the SSL records recorded by the client 104 may have a one-to-one correspondence with the MACs recorded by the witness 106. In addition, if each record contents recorded by the client 104 generates the corresponding recorded MAC using the MAC secret recorded by the witness 106, the communications may be deemed authentic.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising: calculating a first part of a message authentication function by a first processor; calculating a second part of the message authentication function by a second processor; combining the results of the first and second parts into a message authentication code by the first or second processors; using the message authentication code to authenticate data; and calculating the message authentication code using the message authentication function on a data set, wherein the message authentication code can be used to authenticate a record that comprises the data set.

2. The method of claim 1 wherein the message authentication code is used, in part, to authenticate data transmitted between the first processor and a third processor.

3. The method of claim 1 wherein the first and second processors are provided in separate computer systems.

4. The method of claim 1 wherein the first and second parts of the message authentication function consist of one-way hash functions.

5. The method of claim 1 wherein calculating the first part comprises calculating a value without having a data key associated with the function.

6. The method of claim 1 wherein calculating the second part comprises calculating a value for a data set without having contents of the data set.

7. The method of claim 6 further comprising storing the contents into a non-volatile memory coupled to the first processor and storing the message authentication code into non-volatile memory coupled to the second processor.

8. A system, comprising: a first processor configured to compute a first part of a multi-part message authentication function; a second processor in communication with the first processor, the second processor is configured to compute a second part of the message authentication function; wherein the first part of the message authentication function is based on the contents of a record and the second part is based on a data key, wherein the data key is inaccessible by the first processor and the record contents are inaccessible by the second processor; wherein the first processor receives the record from a third processor, computes the first part of the message authentication function using contents of the record, and sends the result of the first part of the message authentication function and a message authentication code in the record to the second processor.

9. The system of claim 8 wherein the message authentication function is used to authenticate data transmitted between the first processor and the third processor.

10. The system of claim 8 wherein the second processor combines the message authentication function parts and provides the combined message authentication function result to the first processor to permit the first processor to authenticate the record with the combined message authentication function result and provide the authenticated record to the third processor.

11. The system of claim 8 wherein the first processor receives the second part from the second processor and encodes a record with the second part and transmits the encoded record to the third processor.

12. The system of claim 8 wherein the second processor combines the message authentication function parts validates a message authentication code using the combined message authentication function.

* * * * *